United States Patent Office 3,373,788
Patented Mar. 19, 1968

3,373,788
METHOD OF SEPARATING EDIBLE FROM FIBROUS PORTION OF ASPARAGUS
Nicolaos Basil Tanos, 1731 R St. NW.,
Washington, D.C. 20009
No Drawing. Original application Mar. 17, 1967, Ser. No. 623,973. Divided and this application Sept. 12, 1967, Ser. No. 667,057
4 Claims. (Cl. 146—241)

ABSTRACT OF THE DISCLOSURE

A method for finding the extent of the edible part of an asparagus stalk by pressing a probe against and along the stalk with a predetermined amount of pressure for locating the point of considerable change in yielding of the surface of the stalk, which point is between the edible and the fibrous part of the stalk, and at or near which point the stalk may be severed for separating the edible from the fibrous part thereof.

---

The invention is a division of my copending application Ser. No. 623,973 filed on Mar. 17, 1967, entitled "Asparagus Cutter," and relates to a method for finding the extent of the edible part of an asparagus stalk by evaluating the yielding of the surface of the stalk to a pressing probe. The method relates also to the separation of the edible from the fibrous part of the stalk.

I found, by pressing a probe on and along the surface of a stalk, that the edible part of the stalk yields distinctly more than the fibrous part thereof and there is a relatively restricted area or point from which a considerable yielding starts, which area or point is the border between the edible and the fibrous part of the stalk.

As a probe may be used any rigid article ending to a not very sharp point, e.g. the cylindrical surface of about 5 mm. in diameter, a rolling cylinder of about the same diameter, or even the nail of a finger. The force to be exercised depends on the diameter and the quality of the stalk and on the extent of the surface of the probe which comes into contact with the stalk. With said cylinder a force of about 1–3 kg. may be used.

To prevent the injuring of the edible parts, the probing may start from the fibrous end and be continued until the stalk starts yielding considerably, e.g. 4–8 mm., depending on the diameter and the quality of the stalk and the pressure exercised thereon. At or near said point the stalk may be cut through for separating the edible from the fibrous part.

What I claim is:

1. The method of separating the edible portion from the tough, fibrous portion of an asparagus stalk comprising the steps of applying a probe against a stalk at a predetermined pressure, moving the stalk and the probe relative to each other in a lengthwise direction of the stalk, and separating the edible portion from the fibrous portion in the area where said stalk yields a predetermined amount.

2. The method of claim 1 wherein the probing starts from the fibrous end of the stalk.

3. The method of claim 1 wherein said probe is a cylinder of about 5 mm. diameter and the force exercised through it to the surface of the stalk is about 1–3 kg.

4. The method of claim 1 wherein the separating step is performed by a severing action.

References Cited
UNITED STATES PATENTS

| | | | |
|---|---|---|---|
| 1,579,598 | 4/1926 | De Back | 146—81 |
| 1,872,889 | 8/1932 | Champlin et al. | 146—81 |

W. GRAYDON ABERCROMBIE, *Primary Examiner.*